United States Patent [19]

Beck

[11] Patent Number: 5,577,197
[45] Date of Patent: Nov. 19, 1996

[54] TEST SYSTEM FOR TESTING ELECTRONIC TRANSACTION PROCESSING SERVICES AT A COMMON CARRIER NETWORK SWITCH

[75] Inventor: Lonnie P. Beck, Allen, Tex.

[73] Assignee: MCI Communications Corporation, Washington, D.C.

[21] Appl. No.: 968,524

[22] Filed: Oct. 29, 1992

[51] Int. Cl.$^6$ ............................. G06F 11/00; H04M 3/08; G07G 1/12; H04Q 9/00
[52] U.S. Cl. ........................... 395/183.04; 395/184.01; 395/187.01
[58] Field of Search ........................ 371/16.2, 20.1, 371/15.1, 11.2, 11.3, 8.2; 364/405, 550; 395/183.01, 183.04, 183.06, 184.01, 185.1, 187.01; 340/825.06

[56] References Cited

U.S. PATENT DOCUMENTS

| | | | |
|---|---|---|---|
| 3,967,250 | 6/1976 | Senda et al. | 395/575 |
| 4,385,384 | 5/1983 | Rosbury et al. | 371/22.1 |
| 4,390,953 | 6/1983 | Johnstone | 395/575 |
| 4,479,122 | 10/1984 | Redman et al. | 340/825.06 |
| 4,545,011 | 10/1985 | Lyon et al. | 395/575 |
| 4,674,055 | 6/1987 | Ogaki et al. | 395/575 |
| 4,872,106 | 10/1989 | Slater | 395/575 |
| 5,148,435 | 9/1992 | Ray, Jr. et al. | 371/20.5 |
| 5,220,663 | 6/1993 | Bauchot et al. | 395/575 |
| 5,255,182 | 10/1993 | Adams | 364/405 |
| 5,256,863 | 10/1993 | Ferguson et al. | 235/383 |

Primary Examiner—Hoa T. Nguyen
Attorney, Agent, or Firm—Pollock, Vande Sande & Priddy

[57] ABSTRACT

A test system for emulating a point of sale transaction from a common carrier switch site. The emulated transaction is monitored and various events which occur during the transaction are timed. The system places a test transaction to a host computer making an inquiry as to the credit status of a particular customer. The various events required to complete the transaction are timed and compared to specific limits to rate the event as either within a predetermined time, or outside a second longer timeout period. Each test transaction is logged to a test result file which may be accessed by an operator interface or by a remote national view computer.

9 Claims, 5 Drawing Sheets

FIG. 5

TEST SYSTEM FOR TESTING ELECTRONIC TRANSACTION PROCESSING SERVICES AT A COMMON CARRIER NETWORK SWITCH

The present invention is directed to simulating point of sale electronic transaction processing over a common carrier network. Specifically, an apparatus is described which will initiate electronic transactions at a common carrier switch concentration facility, and permit emulation of all point of sale electronic transactions for verifying system operability.

Point of sale electronic transaction processing is provided by numerous credit service companies which permits merchants to verify the credit worthiness of purchasers using checks and credit cards. Merchants throughout the world can verify the credit of a potential customer by merely inserting the customer's credit card in a cardreading device. An inquiry is made over a common carrier network to a central computer which contains data concerning the cardholder's account and credit status. Within a few seconds, the merchant is notified as to whether or not the customer's credit is to be accepted based on his current account status.

The common carrier networks which provide these services do so over a data network which utilizes a bandwidth, typically on the order of 300 bytes per second, sufficient for handling small data packets. This data network, which may carry other electronic mail services, employs an X.25 concentrator at various strategic locations to receive inquiries from merchants over the local public telephone network. The transaction information is transferred from the received X.25 concentrator over the data network to a single location having a connected host computer. The host computer contains all information related to the accounts of users of credit cards or other credit-based purchase systems.

Each of the point of sale transactions involves the reading of the customer's card, or other identifying criteria and transferring an inquiry based on such information to the common carrier concentrator. The common carrier concentrator packetizes the data inquiry and sends the same over the network to the host computer. The host computer acknowledges receipt of the data packet and responds in kind by sending the requested information regarding the purchasers account.

The operation of these systems involves data transfer and protocol changes, beginning with the transmission of the inquiry in the form of an analog signal over the local area network to the long distance common carrier concentrator. At this point, the transaction inquiry is demodulated, digitized and placed into a data packet for transmission over one of the channels of an X.25 data network which is dedicated for this service.

A gateway located at the host computer site receives the packet and demodulates the packet which is addressed to the host computer which contains the financial information for the merchant's customer. Once the call is accepted by the gateway, various transactions occur with the host computer, to exchange information between the host computer and point of sale equipment.

The maintenance of the point of sale electronic transaction processing system requires the isolation and analysis of problems which may occur anywhere between the merchant's site and the host computer. The system is susceptible to failure at any one of the intermediate facilities.

Further, the amount of time the transaction takes after initiation from the point of sale location to the time a host computer responds with the credit authorization or denial is important in analyzing the system efficiency and customer service. In the event a merchant suffers undue delays in obtaining verification of an account, it otherwise burdens the traffic handling capability of the long distance carrier, as well as creates unnecessary delays in completing the transaction.

Thus, there is a need for the long distance carrier to verify the performance of the point of sale service, and isolate defects and bottlenecks which occur during electronic transaction processing.

SUMMARY OF THE INVENTION

It is an object of this invention to provide for testing of point of sale electronic transaction processing.

It is another object of this invention to provide a test system which emulates a point of sale electronic transaction processing terminal.

It is yet a more specific object of this invention to determine the performance quality of electronic transaction processing by measuring various parameters associated with a simulated transaction.

These and other objects of the invention are provided for by a test system which will emulate a point of sale transaction at each concentrator switch site of a long distance carrier. The emulated transaction is monitored and various events involved in the transaction between switch site and host computer are monitored for performance evaluation. The various parameters associated with the transaction can be analyzed to isolate problems which may be occurring over the entire system to locate the source of problems which degrade system performance.

In a preferred embodiment of the invention, each of the test systems located at a concentrator site are directly addressable by a central national view monitor system. The central national view monitor system can poll each of the concentrator sites and obtain data files which include test results obtained by each test system.

In accordance with a specific embodiment of this invention, the point of sale test system includes a personal computer which is programmed to emulate the point of sale electronic equipment. The personal computer is connected to the concentrator switch, and is capable of placing a call over the long distance carrier network to the centrally located host computer. The centrally located host computer contains all financial data associated with customers who are subscribers to a credit service recognized by the merchant. A gateway connecting the host computer to a common carrier network will recognize an inquiry coming in from the personal computer for a connection to the host computer. Following the successful connection, transaction information is supplied by the host computer via a gateway and long distance carrier to the test system personal computer.

The personal computer may be configured to automatically conduct tests on a periodic interval, which will generate transaction requests for credit authorization which are sent to the host computer. The number of successful completed transactions, as well as the number of failed requests, are logged in a data file of the personal computer for analysis.

Each attempted transaction is monitored to determine whether the various events which comprise the entire transaction occur within the requisite system performance limits. These events include in the preferred embodiment the modem connect time, the X.25 circuit setup time, the transaction time which occurs between the sending of an authorization request and the authorization response, and the call teardown time.

DESCRIPTION OF THE PREFERRED EMBODIMENT

Figure 1:
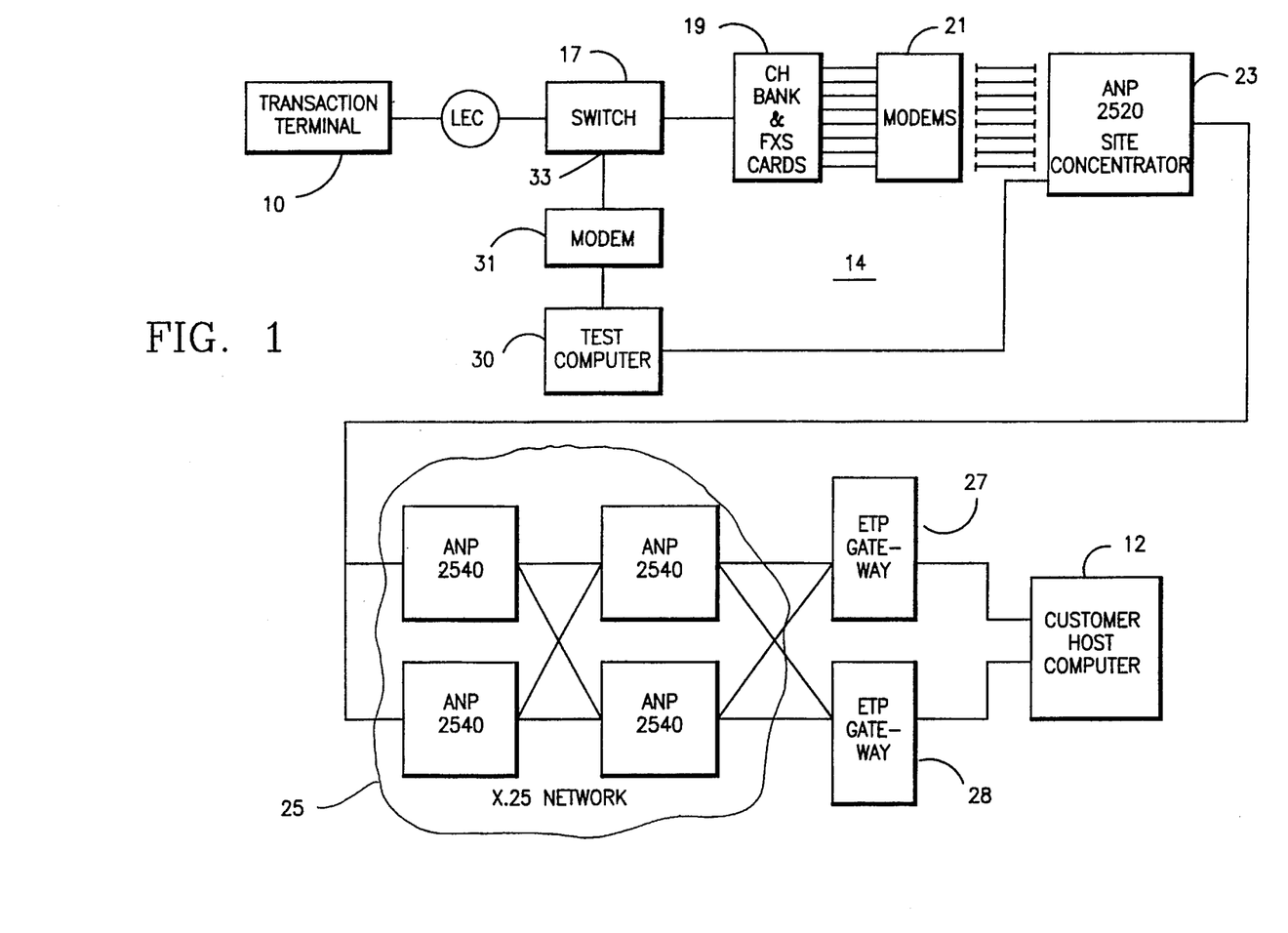
FIG. 1 illustrates the test system in accordance with a preferred embodiment for testing point of sale transaction processing.

Referring now to FIG. 1, there is shown a point of sale electronic transaction processing system for connecting a user point of sale terminal 10 to a credit card issuer's host computer 12. The host computer 12 contains records concerning the credit of various credit card holders who are requesting credit at the point of sale.

In operation, a credit card purchase is processed by reading the credit card at the point of sale. The amount of credit being sought, as well as the full identity of the purchasing party is transmitted over a VISA 1 protocol 800 number service to a common carrier switch site 14. The switch site 14 includes a modem which will communicate with the point of sale terminal 10 via a local area network using the VISA 1 protocol.

The switch 17 receives the 800 number dialed from the point of sale terminal 10 and performs an in switch translation. The switch 17 will seize a DAL which is connected to the channel bank 19. The channel bank 19 is connected to a plurality of modems 21. The channel bank 19 provides a ring signal to one of the attached modems 21. The modem then provides a loop closure to the switch and initiates a handshake with the POS terminal 10. During the handshake routine, the modem sets the DSR, CTS, DCD lead HI to OSS X.25 network site concentrator 23, which initiates the autocall feature and places a call to one of the gateway computers.

The forwarded data packet received from the POS terminal 10 are transmitted over the X.25 network 25 to a pair of ETP gateways 27 and 28 which connect to the credit issuer's computer 12. The ETP gateway (27 or 28) acknowledges a call request by transmitting a packet with the ASCII character ENQ.

Once the ENQ character is received by the modem 21, and is forwarded to the merchant's POS terminal 10, the ENQ serves as an acknowledgement, indicating that the host computer is ready to receive the transaction packet. The POS terminal will then forward the credit inquiry, via the transaction packet, over the network thus established to the host computer 12. The response from the host computer which may be either an authorization or a disapproval, is forwarded through the respective gateway 27 or 28 to the point of sale terminal 10. Upon successful receipt of the authorization or disapproval message, the point of sale terminal responds to the customer host with the ASCII character <ACK>. The gateway then sends an <EOT> character to signify the completion of the transaction. Upon receipt of the <EOT>, the POS terminal returns to the ON-HOOK state and clears the call through the switch channel bank and modem. Upon receipt of the authorization or disapproval response by the point of sale terminal 10, the POS terminal sends an ASCII <ACK>. The modem of the modem bank 21 returns to the ON HOOK condition, and lowers, which causes the site concentrator to send a CALL-CLEAR packet to the gateway, thus ending the call and returning to a READY state.

Figure 2:
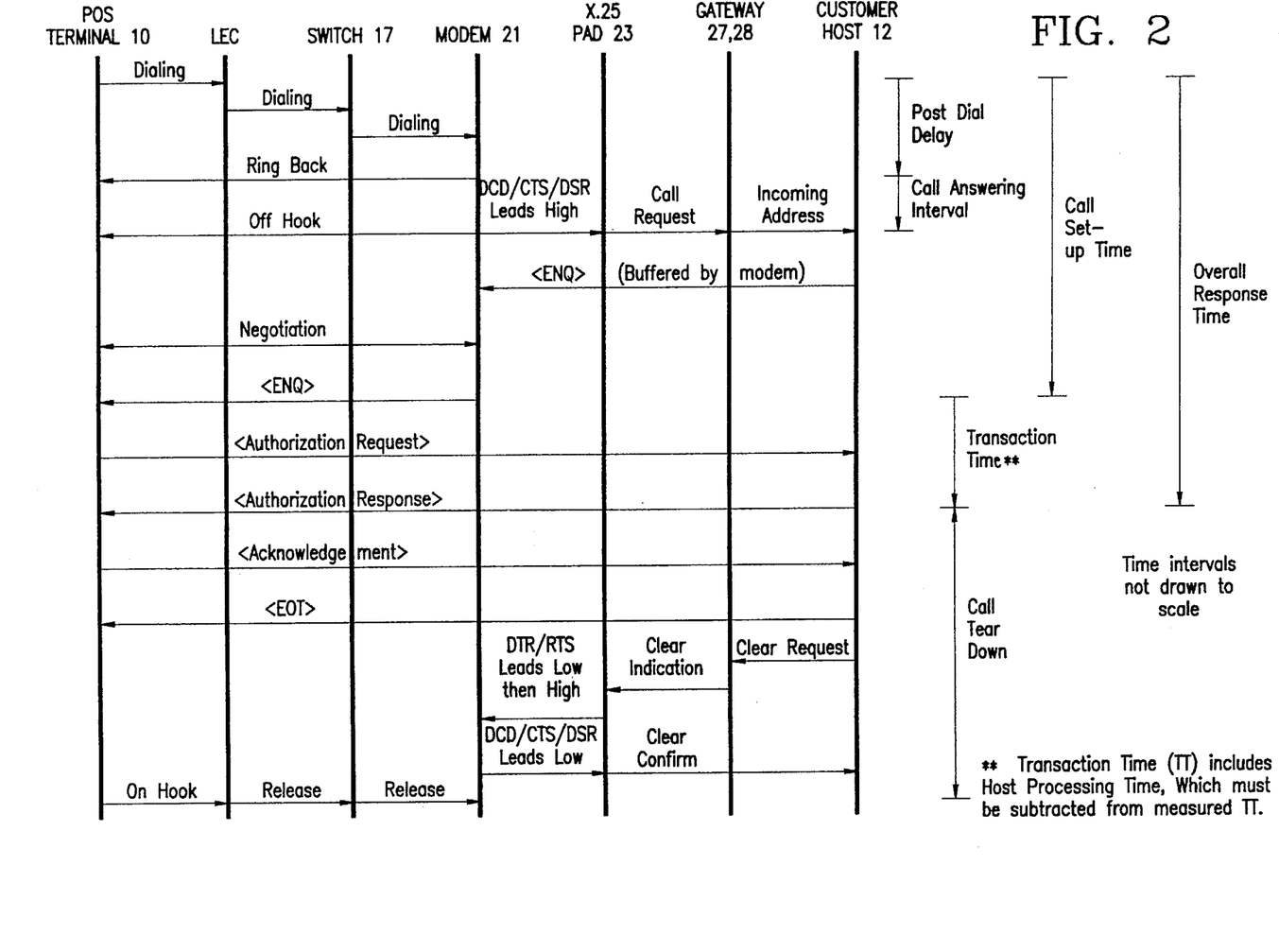
FIG. 2 illustrates the sequence of events which occur during a point of sale transaction.

The foregoing transaction scenario is illustrated in FIG. 2, along with the various problem areas in the system which will result in a failure or inefficient use of the network.

The first area where problems may occur include the modem connect time, which is the interval which occurs from the time the point of sale terminal 10 dials the 800 switch and the time a connection is made to the modem of the modem bank 21. The modem 21 connect time includes the post dial delay to the switch site 14, the modem answer time, and the modem negotiation time. Problems during this portion of the transaction ultimately either delay or render inoperative the service.

The X.25 circuit 23 setup time is the time portion of the transaction which occurs from the MODEM CONNECT until the ENQ character is received by the X.25 network modem 21 from the gateway 27 or 28.

The transaction time, represented by the time from when the point of sale terminal 10, following receipt of an ENQ signal from the host 12, sends the transaction packet and waits for a valid authorization response is critical in system performance. Problems which occur during this portion of the transaction may be traced to the X.25 network 25, the gateway computer 12 or the modem 23.

The call tear down time is that portion of the transaction which occurs from the time that the point of sale terminal 10 forwards an acknowledgement back to the gateway 27, 28 until the point of sale terminal receives an EOT character. When this portion of the time is excessive, or when the EOT is not received, the problem may be anywhere in the system.

The present invention is provided to emulate a point of sale terminal transaction. The invention includes a point of sale test computer 30 connected through a modem 31 to an unused port 33 of the switch 17. The point of sale transactions may be originated at the switch site 14, and the various time intervals which make up a transaction may be measured and compared against a previously determined performance level.

Figure 3:
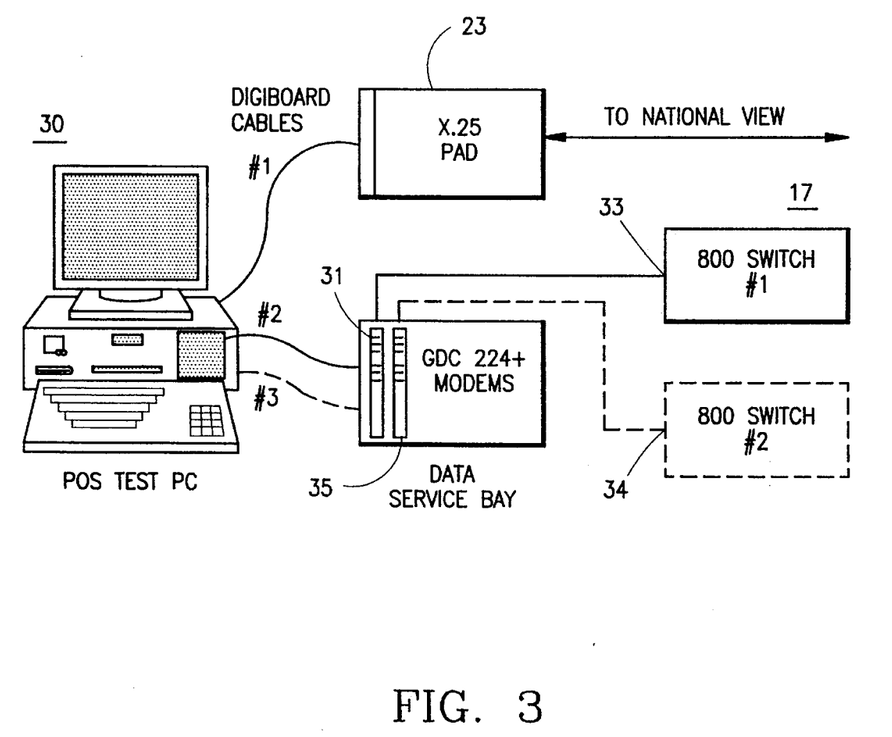
FIG. 3 illustrates the connection between the computer, modem and common carrier local switch.

Referring now to FIGS. 1 and 3, there is shown the test computer 30 and modem connections for connecting to the switch 17. The computer 30 includes a digiboard 31 which normally provides for four (4) output ports, three of which are shown in use.

The first of the ports is connected to a CDC 224 modem 31 for emulating the modem of the point of sale terminal 10. The modem 31 is shown connected to the spare switch port 33. Thus, the switch 17 will view a connection to the port 33 as a connection from the local area network providing a connection to a point of sale terminal.

In some installations, a second switch port 34 may be available for connection to either a point of sale terminal or the computer 30. A second modem 35 is provided in these switch sites which have additional switch ports which are to be tested.

A final connection is shown to the concentrator 23 directly from port 1 of the digiboard. This permits an inquiry to be issued over the X.25 network from a national view computer located at a central site, to obtain test records stored in a file within computer 30. Files in computer 30 may be downloaded upon request of the national view computer so that a central administrator may analyze and identify the performance of tests conducted at various switch sites.

The tests carried out by the test computer 30 which emulates point of sale equipment includes the following four steps of Table 1, each of which corresponds to a timed event in the point of sale transaction process. The first limit indicates the expected performance and the timeout indicates the time in seconds beyond which performance is considered to be a failure.

TABLE 1

| STEP | EVENT | START/STOP | LIMIT* (seconds) | TIMEOUT* (seconds) |
|---|---|---|---|---|
| 1 | Modem Connect Time | Dial to Modem Connect | 10.0 | 15 |
| 2 | X.25 Circuit Set-up | Modem Connect to <ENQ> from PAD | 4.0 | 10 |
| 3 | Transaction time | Transaction sent to valid Authorization Response | 4.0 | 10 |
| 4 | End transaction time | <ACK> to <EOT> from Gateway | 4.0 | 10 |

*times are variable depending on customer specifications

During the placement of a test call by the test computer, the progress of the placement process will be displayed on the compute 30 display screen. Each of the above steps will be displayed on the screen as they occur in a format shown in Table 2. Table 2 shows two test sessions corresponding to the situation wherein two switches at a switch site are being accessed by the personal computer. In point of fact, more often switch sites will only have one test session as there will be only one switch available over which to conduct such transactions.

TABLE II

Test Session 1-DAL1

```
Cust: Telecheck      Port: 2852
Host: HOST2 - Chicago
Calls: 100           Fails: 1
Failure Rate 1%
Test Mode: Auto      AR: ON
Step:    1    2    3    4
Limit:  10.0  4.0  4.0  4.0
Actual: 12.2  2.6
            Test Session 2

Cust:                Port:
Host:
Calls:               Fails:
Failure Rate:
Test Mode: Idle      AR: OFF
Step:    1    2    3    4
Limit:
Actual:
```

Table 2 includes the following information:

CUST: When a test is in progress, the customer name (e.g., TELECHECK) will appear in this field HOST: When a test is in progress, the host name (e.g., HOST2-Chicago) will appear in this field PORT: When a test is in progress, the switch port being used will be displayed in this field CALLS: This field will display the total number of test calls which have been made on the switch for the current day FAILS: This field will display the total number of test calls which have failed for the current day FAILURE RATE: The percentage of calls which have failed during the current day TEST MODE: The test mode can be one of the following:
IDLE No test is currently being performed
AUTO An auto-routine test is being performed
MANUAL A manual test is being performed AR: The current auto-routing setting (ON or OFF)

In the automode, a screen is presented on the personal computer at the selection of the operator from a menu to elect the time in which test calls will be placed, as well as the interval between test calls. Each test as it progresses is displayed in the format shown in Table 2.

Additionally, each call is logged in a test results log file whether or not the call is considered a failure, i.e., not meeting the criteria shown in Table 1. Table 1 includes a limit within which time the step should be completed. If the limit is exceeded and a second timeout limit is exceeded as shown in Table 1, the call is terminated and the test call is reported as an incomplete transaction.

The failures are therefore categorized as either being a slow response, or as a failure depending on which limit is exceeded. Therefore, in step 1 if the TIMEOUT limit is exceeded the error is reported as a MODEM DID NOT CONNECT. If only the limit time was exceeded then the failure is reported as a SLOW MODEM RESPONSE.

The same types of error messages are generated for steps 2, 3 and 4, depending on whether the first limit or timeout limit is exceeded.

A failure log reporting all failed test calls takes the format of Table 3 and is stored by the computer in a file which can be accessed either by the user of the test computer or by the national view computer, which is connected to poll the local test computer to obtain the contents of the failure log.

TABLE 3

| | | | | |
|---|---|---|---|---|
| 02-12-92 | 12:02:04a | TELECHECK | IRV1 1341 | SLOW MODEM RESPONSE |
| 02-12-92 | 12:02:04a | TELECHECK | IRV1 1341 | SLOW X.25 SETUP |
| 02-12-92 | 12:06:08a | TELECHECK | IRV1 1342 | SLOW MODEM RESPONSE |
| 02-12-92 | 12:06:08a | TELECHECK | IRV1 1342 | SLOW X.25 SETUP |
| 02-12-92 | 12:02:41a | TELECHECK | IRV1 1342 | MODEM DID NOT CONNECT |
| 02-12-92 | 12:29:26a | TELECHECK | IRV1 1342 | MODEM DID NOT CONNECT |
| 02-12-92 | 01:12:20p | TELECHECK | IRV1 1340 | SLOW MODEM RESPONSE |
| 02-12-92 | 01:12:59p | TELECHECK | IRV1 1341 | SLOW MODEM RESPONSE |

TABLE 3-continued

| | | | | |
|---|---|---|---|---|
| 02-12-92 | 01:13:28p | TELECHECK | IRV1 1342 | SLOW MODEM RESPONSE |
| 02-12-92 | 01:14:53p | TELECHECK | IRV1 1340 | SLOW MODEM RESPONSE |
| 02-12-92 | 01:14:53p | TELECHECK | IRV1 1340 | SLOW TRANSACTION RESPONSE |
| 02-12-92 | 01:16:19p | TELECHECK | IRV1 1341 | SLOW MODEM RESPONSE |
| 02-12-92 | 01:16:29p | TELECHECK | IRV2 9W1854852 | MODEM DID NOT CONNECT |
| 02-12-92 | 01:17:10p | TELECHECK | IRV2 9W1854852 | MODEM DID NOT CONNECT |
| 02-12-92 | 01:17:51p | TELECHECK | IRV2 9W1854852 | MODEM DID NOT CONNECT |
| 02-12-92 | 01:18:21p | TELECHECK | IRV1 1342 | SLOW MODEM REPONSE |
| 02-12-92 | 01:19:40p | TELECHECK | IRV1 1343 | SLOW MODEM RESPONSE |
| 02-12-92 | 01:20:26P | TELECHECK | IRV2 9W1854852 | MODEM DID NOT CONNECT |
| 02-12-92 | 01:21:01p | TELECHECK | IRV1 1340 | SLOW MODEM RESPONSE |
| 02-12-92 | 01:21:07p | TELECHECK | IRV2 9W1854852 | MODEM DID NOT CONNECT |
| 02-12-92 | 01:21:48p | TELECHECK | IRV2 9W1854852 | MODEM DID NOT CONNECT |
| 02-12-92 | 01:22:21p | TELECHECK | IRV1 1341 | SLOW MODEM RESPONSE |

920211_F.LOG - Alt-A menu, Alt-H help -------------line 1 col 1 ----

Figure 4:
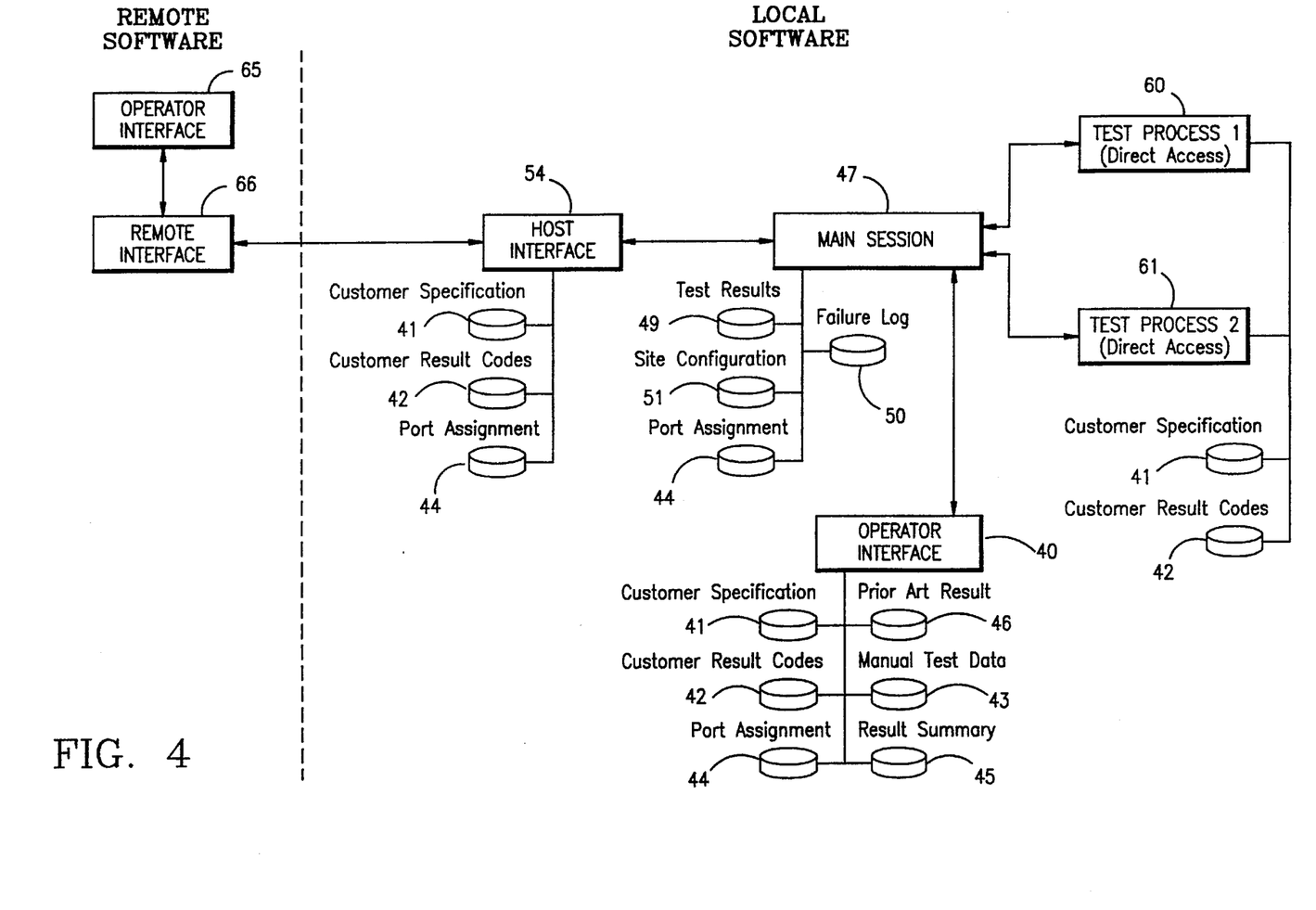
FIG. 4 illustrates the software organization of the test computer.

The general organization of the software of the test computer is shown more particularly in FIG. 4. The configuration shown in FIG. 4 represents a number of sessions which run concurrently in a multitasking environment. The software can be defined as five separate sessions which include a main session 47, an operator interface 40, a host interface 54 and two test sessions 60, 61. The two test sessions actually implement the initiation of a test call transaction and measure the system performance. Two test sessions, 60 and 61 are shown, assuming there are two ports on a switch which are to be tested.

The host interface 54 is the interface with the national view computer via the X.25 network which permits the downloading of various specifications to the test computer 30 from a central site. The host interface 54 will control the files in the test computer identified as customer specification 41 and customer result codes 42.

The specification file contains the details about the authorization request packet for the particular service being tested as well as the timing values of Table 1 for the transaction events. The customer result codes file contain each of the results of Table 3 associated with the measured times for each of the events. As the contents of each of these files is dependent on the particular service being tested, they cannot be accessed by the operator interface 40.

The main session handles program management by verifying the existence of all necessary external files and subdirectories, as well as handling program initialization. All message traffic between each of the sessions is controlled by the main session 47. Test data results obtained from each of the test processes sessions 60 and 61 are written to the test results file 49 by the main session 47. Status messages are also generated from the test sessions when tests are in progress, and which are used to update the screen displays of FIG. 3 of the operator interface 40 by the main session 47. The main session 47 also receives demands from the operator interface 40 requesting the performance of manual tests, the auto routing configuration, and system shutdown.

The site configuration file 51 contains data which is unique to the particular switch site of the test computer. The main session reads the data during an initialization routine to provide the information unique to the site. This file can be modified by the user/operator interface 40. The parameters inputted by the user, identifying conditions at the switch, i.e., switch site identity, port number, data trunk card type, etc., is entered into a file structure in accordance with the following:

| Field | Length | Description |
|---|---|---|
| Site Name | 25 | Name of the Switch Site |
| Switch Number | 1 | Number of Switches Present At Site |
| SW1 Type | 3 | Type of Switch for #1 (DEX or DMS) |
| SW1 Name | 4 | Name for Switch #1 |
| SW1 Trunk | 8 | Trunk type for Switch 1 |
| SW1 Dtc | 4 | Data Trunk Card for Switch 1 |
| SW2 Name | 4 | Name for Switch #2 |
| SW2 Type | 3 | Type of Switch for #2 (DEX or DMS) |
| SW2 Trunk | 8 | Trunk Type for Switch 2 |
| SW2 Dtc | 4 | Data Trunk Card for Switch 2 |

There is a switch port assignment file 44 also accessed by the main session 47, introduced by the operator interface 40. This file is read by the user interface during manual test selection and by the main session when starting an auto-routining test. The switch port/customer assignment file contains multiple records in two fields as follows:

| Field | Length | Description |
|---|---|---|
| Port Access Number | 10 | Switch Port Access Number |
| Customer | 12 | Name of the Customer |
| Pad | 4 | PAD Number |
| Node | 3 | PAD Node |
| Pad Port | 3 | PAD Port Number |

The switch port customer assignment file will permit the test call to be placed by identifying the called party, calling ports and other necessary data for making the call to the host computer containing the financial records.

The test results file 49 contains the results of all manual and automatic routine test calls for a 24-hour period. The results for all these tests performed on every switch, switch port and customer are written to a single file which is closed each day at midnight in accordance with the preferred embodiment. A new test result file is then created to receive additional test results in the following 24-hour period. Only the main session can write data to the current test result file 49. The main session will make the current test results available to the operator interface 40 when the user wants to review the test results. The operator interface 40 then reads the test results files for test results summary generation. The current test results file is copied by the main session to allow the user interface access for test results summary generation. The main session automatically deletes the old test result files after 30 days.

The test results file structure are shown below:

| Name | Length | Description |
| --- | --- | --- |
| Start CLK | 12 | Date and Time of Start of Test |
| Switch | 4 | Designator of Switch Under Test |
| Port | 10 | Designator of Switch Port Under Test |
| Connect Time | 3 | Measured Value for Connect Time |
| Conn Res Code | 2 | Result Code for Connect Time Parameter |
| Set Up | 3 | Measured Value for X.25 Set-Up Time |
| Setup Res Code | 2 | Result Code for Connect Time Parameter |
| T Trans | 3 | Measured Value for Transaction Time |
| Trans Res Code | 2 | Result Code for Connect Time Parameter |
| EOT Time | 3 | Measured Value for End Transaction Time |
| EOT Res Code | 2 | Result Code for Connect Time Parameter |
| Disconn Time | 3 | Measured Value for Disconnect Time |
| Disconn Res Code | 2 | Result Code for Disconnect Time Parameter |
| Pass Fail | 1 | Overall Test Result (Pass, Fail, Terminate) |
| Test Mode | 1 | Test Mode (Manual or Auto) |
| Call Time | 3 | Overall Call Time |
| Term Call | 1 | True/False Indicating If Call Was Terminated |

The failure log 50 of Table 2 contains a record for each failure which occurred when a test call was placed. It is maintained by the main session 47 which receives the test results from test process session 60 and 61. At the top of each hour, the main session 47 rewrites the failure log 50 to remove any entries recorded more than 24 hours ago. Any new failures are written to the failure log file as they occur. The failure log data is made available to the user interface session when needed for display purposes. This file contains multiple records with the fields identified in the following table:

| Name | Length | Description |
| --- | --- | --- |
| Date | 6 | Date at Start of Test |
| Time | 6 | Time at Start of Test |
| Customer | 12 | Name of Customer |
| Switch | 4 | Switch Designator |
| Port | 10 | Switch Port Access Number |
| Res Msg | 26 | Results Message |

The operator interface 40 will control the display of tests in session, as well as initiate tests in accordance with input, date and time selections made by the operator. Further, a manual test may be initiated by the operator interface 40 to place a call through a particular switch port. During manual testing, the results are posted on the display as they occur. Further, a manual test data file 43 will record these results in the table structure shown below:

| Name | Length | Description |
| --- | --- | --- |
| Date | 6 | Date at Start of Test |
| Time | 6 | Time at Start of Test |
| Customer | 12 | Name of Customer |
| Switch | 4 | Switch Designator |
| Port | 10 | Switch Port Access Number |
| Res Msg | 26 | Results Message |
| St1 Time | 3 | Step 1 Measured |
| St1 Code | 2 | Step 1 Result Code |
| St2 Time | 3 | Step 2 Measured |
| St2 Code | 2 | Step 2 Result Code |
| St3 Time | 3 | Step 3 Measured |
| St3 Code | 2 | Step 3 Result Code |
| St4 Time | 3 | Step 4 Measured |
| St4 Code | 2 | Step 4 Result Code |
| St5 Time | 3 | Step 5 Measured |
| St5 Code | 2 | Step 5 Result Code |
| Pass Fail | 1 | Overall Pass/Fail |
| T Total | 3 | Total Time |

Thus is generally shown the general organization of the software contains all the information necessary to place a test call, and measure the transaction response to the test call for a particular customer. The customer is the credit agency whose records are in the host computer.

The operator interface 40 also provides through menu selection a result summary file 45 to be configured from the test results file 49. Result summary file 45 is configured in accordance with the preferred embodiment to include a summary of completed calls made during the auto test period of the previous 24 hours. This summary includes the number of completed calls and number of incomplete calls.

As a further summary, the report will summarize for all failed test calls the number of times the timeout was exceeded in each of steps 1, 2, 3 and 4 by virtue of the TIMEOUT limit being exceeded. Further, a presentation of the completed calls may summarize the average time for each of steps 1, 2, 3 and 4 taken for all the completed calls. The summary takes the form of the following:

|  | Saturday, Feb. 15, 1992 | Irving | 07:03:28p |
| --- | --- | --- | --- |
| Results Data Selected |  |  | Results Messages |

| Customer: TELECHECK |  | Rate | Messages |
| --- | --- | --- | --- |
| Switch: IRV1 | Switch Port: 1340 | 36.1% | PASS |
| Pad: | Pad Port: | 27.6% | SLOW MODEM RESPONSE |
| Test Type: ALL | Test Result: ALL | 19.1% | MODEM DID NOT CONNECT |
| Start: 02-12-92 - 00:00:00 |  | 12.7% | SLOW X.25 SETUP |
| End: 02-15-92 - 19:03:00 |  | 4.2% | X.25 SETUP TIMEOUT |
| Summary Tests Complete Incomplete |  |  |  |
| Totals 47 33 14 |  |  |  |

|      | Completed Calls | | | | | Incompleted Calls | | |
|------|------|------|------|------|------|------|------|------|
|      |      | Avg  | Total | Failure | | Terminate | | |
| Step | Limit | Time | Pass | Fail | Rate | Step | Total | Percent |
| 1    | 10.0 | 8.8  | 23   | 10   | 30.0% | 1    | 9    | 64.0% |
| 2    | 4.0  | 2.8  | 27   | 6    | 18.0% | 2    | 4    | 28.0% |
| 3    | 4.0  | 1.7  | 32   | 1    | 3.0%  | 3    | 1    | 7.0%  |
| 4    | 4.0  | 0.1  | 33   | 0    | 0.0%  | 4    | 0    | 0.0%  |

<C> Configure
<G> Generate Summary
<S> Save Summary
<Q> Quit

Figure 5:
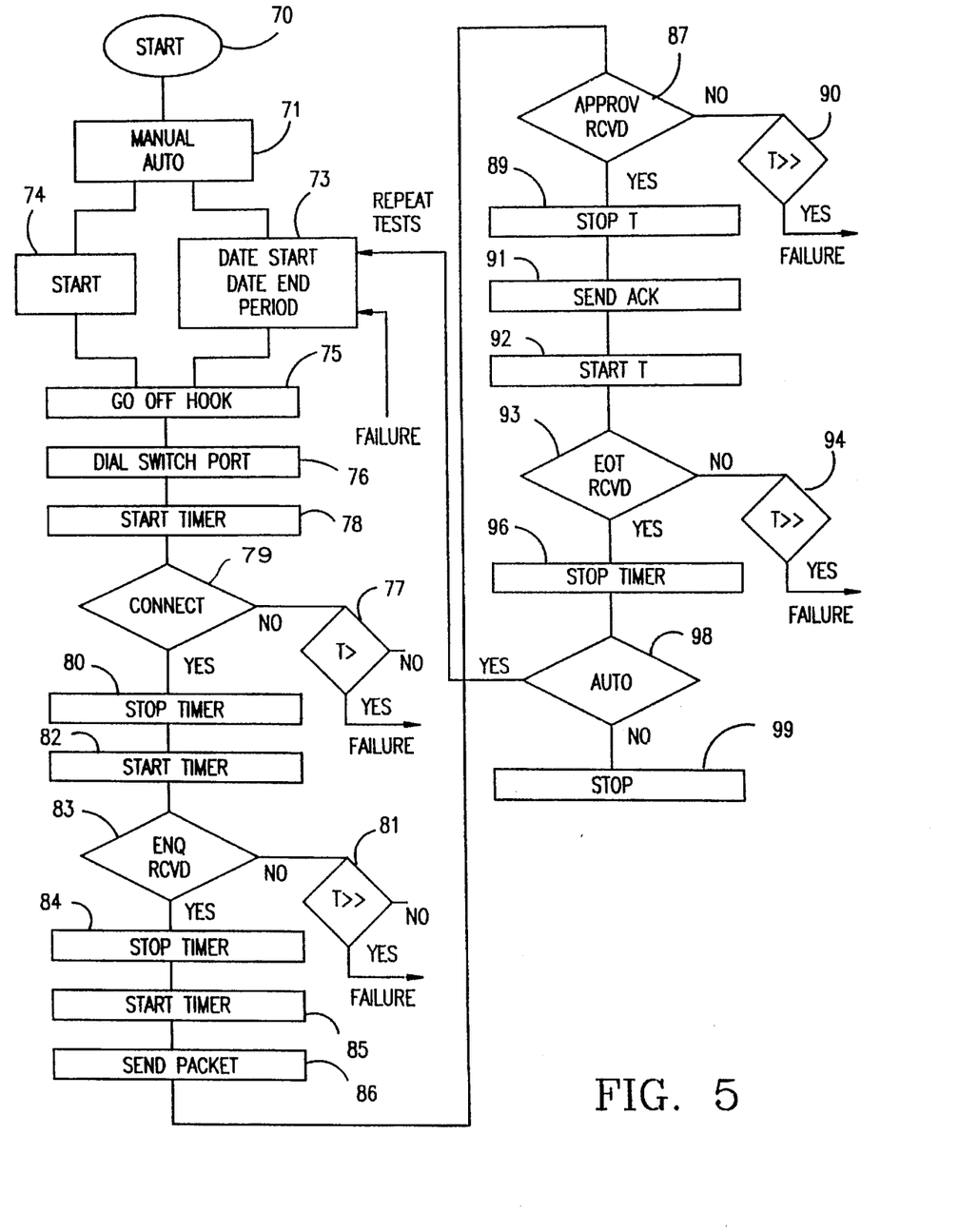
FIG. 5 is a flow chart which demonstrates the execution of a test session.

Referring to FIG. 5, there is shown the sequence of execution for a test session for one of the switches which is connected to the test personal computer 30 via the modem of FIG. 1. The start 70 of FIG. 5 produces a menu selection for the operator interface 40. The menu selection will request selection of either the auto mode or the manual mode for placing test calls over the network.

In the auto routine mode 73, a start date, end date and period of calls is entered. From this information, the computer will place calls at the rate indicated by the period between the two dates.

In the start mode 74, the operator places a single call over a switch and port assignment file 44. The personal computer, having once been programmed to begin a test sequence, will signal the connected modem to go OFF HOOK in 75, indicating to the modem that it is to place a call. A switch port is dialed by the computer in step 76, which dials the dedicated channel connected to the host computer containing the financial information of interest. A timer is started in step 78 following the last digit dialed to measure the connect time for the modem.

Decision block 79 will detect the presence of a carrier transmitted back from the switch to connect the modem. If the time for the connect exceeds the failure TIMEOUT of Table 1 in decision block 77, the modem is considered to be defective and a failure notice is posted to the test results log for the test. If the connect is received within the time limit, the timer 80 is stopped, and this time is indicated to the test log as the modem response time. Entries are made in the test failure log if the modem response time exceeds either of the limits of Table 1.

The timer is started following the connection of the modem in step 82 and stopped in step 84 to measure the setup time between the modem and the X.25 circuit. The time interval from the modem connect to receipt of ENQ from the system gateway is determined in decision block 83 and is measured. In the event the ENQ is received outside its TIMEOUT limit, decision block 81 will post a failure indication to the test results log 49 and failure log 50.

The time for the ENQ to be received is noted in the test results log 49 when the timer is stopped in step 84. If the timer value exceeds the LIMIT in Table 1, a SLOW X.25 SETUP is posted to the failure log 50 (see Table 3).

The process of timing the remaining portions of the transaction continues in step 85, wherein the timer is started and a transaction packet sent from the personal computer in step 86. The transaction packet is obtained from the customer specification file 41 for the particular POS service being tested. When the approval code, previously stored, is received from the host computer 12, via the gateway 88, as detected in step 87, the timer is stopped in step 89. In the event the approval code is not received within its TIMEOUT limit, decision block 90 will post a failure to the test results file 49. If the time exceeds the time limit of Table 2, this is noted in the failure log 50 as a SLOW TRANSACTION RESPONSE.

The remaining event to be timed is the tear down of the call. Following receipt of the approval code, an acknowledgement is sent in step 91 by the test computer to the gateway, signifying that the approval packet was received. The timer is started again in step 92 and awaits the receipt of the EOT transmission from the gateway and host computer tearing down the call. Decision block 93, when the EOT is received, will stop the timer in step 96 so that this portion of the transaction time can be measured and logged into the test results log 49. In the event the EOT is not received within the TIMEOUT limit of Table 1, as determined in decision block 94, a failure is posted to the test results log 49 and failure log 50. In the event the teardown time exceeds the LIMIT of Table 1, the event is noted in the failure log 50 as a SLOW TEARDOWN. In the event the system is in the auto routine mode, decision block 98 insures the tests are repeated.

In the auto routine, control will be sent back to step 73 so that additional calls may be made between the start times previously entered by the operator interface 40.

The test results log 49 and failure log 50 are accessible by the operator interface 40. A result summary 45 may be compiled from the failure log 50 for any time interval of interest or switch port of interest which was subject to one of the test processes in sessions 60 and 61. Prior test result file 46 will be updated each time the test results file 49 is cleared so that a running history of prior tests is maintained in the prior test result file 46.

Manual test data which was obtained by electing the manual test function of block 74 will be entered in the test results log file 49 and failure log 50, as well as in the manual test data file 43.

The operator may view the contents of any of these files upon menu selection to identify problem areas. As each of the four functions of Table 1 have been tested, and the time of response noted in the logs, both test calls which did not pass the criteria of the customer specification, and test calls which did pass and were noted in the test results file 49, diagnostics may be accomplished to locate system weak points for upgrade and/or repair.

The national view test computer may access the failure log or test results file 49 by placing a call to the test computer via the X.25 port connection of FIG. 3. In this way, performance may be compared at the national view computer of all switch sites test results and failure logs.

What is claimed is:

1. A point of sale test system for testing point of sale/electronic transaction processing services made over a common carrier network having a plurality of switches to a computer containing financial records of a plurality of customers comprising:

a modem connected to a switch port of a network switch of said common carrier network; and a test computer located at said network switch and connected to said modem, said test computer programmed to:

initiate at periodic intervals a transaction between said test computer and said computer containing financial records, via said common carrier network, said transaction simulating said point of sale/electronic transaction processing services, said transaction comprising an exchange of information packets between said computers, said transaction beginning with a command by said test computer to said modem to go off hook and dial a destination number of a gateway connecting said computer containing financial records with said common carrier network;

monitor the transaction time required for the exchange of said information packets, including a series of consecutive sub-intervals of said transaction time, a first sub-interval representing a connect time for said modem, a second sub-interval representing an interval following said modem connect time and receipt of an acknowledgement frown said gateway, a third sub-interval representing a transit time between transmission of a packet from said test computer and receipt of a response packet from said computer containing financial records, and a fourth sub-interval representing the time between transmission of an acknowledgement from said test computer and an end of transmission packet from said computer containing financial records; and, display an indication of the quality of said services as a function of said monitored time.

2. The point of sale test system of claim 1 wherein said indication of quality includes indicating the number of transactions initiated at periodic intervals and the number of transactions which could not be completed in a given amount of time.

3. The point of sale test system of claim 2 wherein said indication of quality includes identifying the number of transactions which have been successfully completed in said given amount of time.

4. The point of sale test system of claim 3 wherein said indication of quality includes a running average of time data monitored in a plurality of successive transactions.

5. The point of sale test system of claim 1 further comprising:

a display national view computer connected at another switch of said common carrier network for communicating with said test computer over said common carrier network; and, a digital data interface between said test computer and said common carrier network for transferring data indicating said quality obtained by said test computer to said national view computer.

6. A point of sale test system for testing point of sale/electronic transactions processing services which communicate over a common carrier network connecting a point of sale terminal and a host computer containing financial records of a plurality of users of said services, comprising:

a modem connected to a switch port of a network switch of said common carrier network;

a test computer functionally connected to said modem, said computer programmed to attempt a transaction with said host computer by carrying out the steps of:

dialing the number of a gateway of said common carrier network, said gateway connected to said host computer containing financial records of said plurality of users, whereby said common carrier network establishes a call connection with said gateway and host computer;

issuing an inquiry data packet over said network from said test computer which results in said host computer issuing an authorization code over said network to said test computer;

measuring the time interval required to set up said call connection and the time interval from when said test computer issues an inquiry data packet to when said authorization code is received by said test computer; and, displaying each of the measured time intervals with respect to first and second time limits; and, storing each measured time interval which exceeds said time limits in a failure log, wherein said second time limit represents a measured time interval indicating the transaction has failed, and said first limit indicates said measured interval exceeds an allowable transaction time.

7. The point of sale test system of claim 6 wherein said test computer includes a test result log for storing the measured intervals for each call which is set up.

8. The point of sale test system of claim 6 wherein said test computer provides a summary log containing the number of failed transactions and the number of successful transactions.

9. The point of sale test system of claim 8 wherein said summary log contains a summary of the measured time intervals for each call connection.

* * * * *